No. 732,998. PATENTED JULY 7, 1903.
B. BRAND.
SHOE FOR CLOVEN-FOOTED ANIMALS.
APPLICATION FILED OCT. 24, 1902.
NO MODEL.
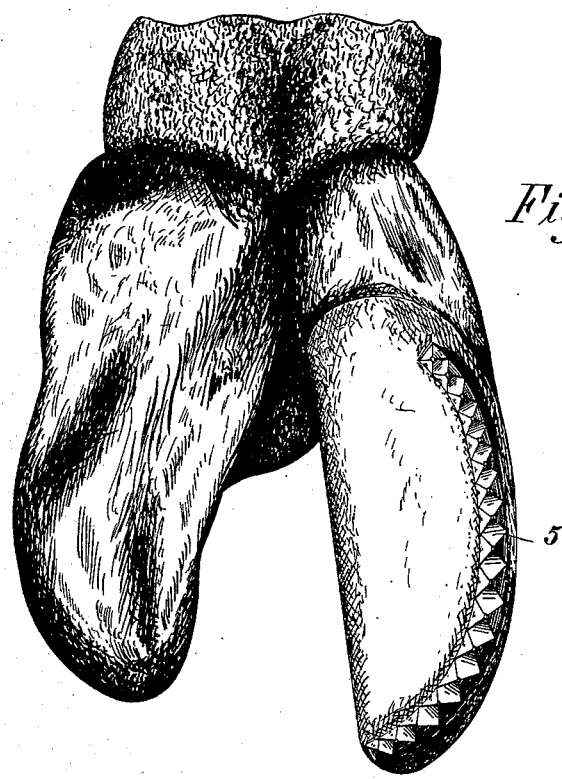
Fig. 1.
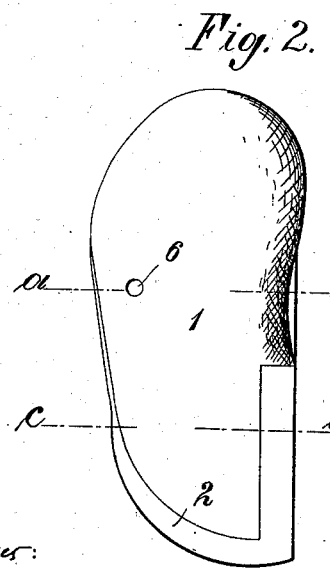
Fig. 2. Fig. 3.
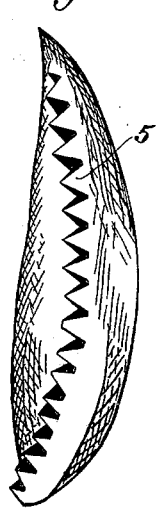
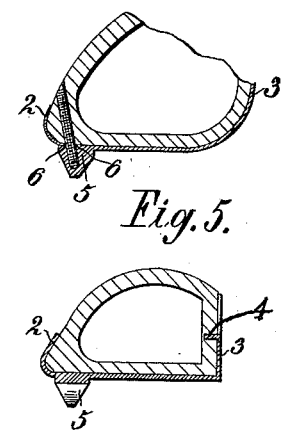
Fig. 4.
Fig. 5.
Witnesses:
Ger. Heinrich
Edwin Ferry
Inventor:
Bernhard Brand
per G. Dittmar
Attorney No. 732,998. Patented July 7, 1903.

UNITED STATES PATENT OFFICE.

BERNHARD BRAND, OF BRAILA, ROUMANIA.

SHOE FOR CLOVEN-FOOTED ANIMALS.

SPECIFICATION forming part of Letters Patent No. 732,998, dated July 7, 1903.

Application filed October 24, 1902. Serial No. 128,607. (No model.)

*To all whom it may concern:*

Be it known that I, BERNHARD BRAND, a subject of the King of Roumania, residing at Braila, Roumania, have invented certain new and useful Improvements in Shoes for Cloven-Footed Animals, of which the following is a specification.

The subject of the present invention is a device for shoeing cloven-footed animals.

The characteristic of the invention is that wearing-surfaces corresponding to the shape of the hoof are provided with a light encircling portion and have a horizontally-bent edge which can be forced into a corresponding groove upon the hoof. The whole is secured to the hoof by means of a screw passing through the hoof. The wearing-surface of the shoe is provided with points or projections.

In the accompanying drawings is shown the shoe embodying my invention.

Figure 1 shows an under side view of a hoof to which the shoe has been attached. Fig. 2 gives a view from above of the shoe. Fig. 3 is a side view of the same, from which can be seen the points or projections attached to the wearing-surface. Fig. 4 shows a section on the line A B of Fig. 2. Fig. 5 shows a section on the line C D of Fig. 2.

The wearing-surface 1 is formed and curved to correspond with the shape and configuration of the hoof, and it possesses an upwardly-bent edge 2 for a portion of its circumference on one side and upon the other side a similar edge 3. One part of the edge 3 is bent over, so as to form a horizontal flange 4. The wearing-surface of the hoof is provided with a row of projections 5, which may naturally be replaced by another suitable arrangement of points. The securing of the shoe to the hoof is effected by making a groove in the hoof with a small saw to correspond to the flange 4 and then forcing the shoe onto the hoof. This securing is made more sure by boring a hole through the hoof and passing a screw therethrough, which takes into a corresponding screw-threaded hole 6 in the wearing-surface of the shoe.

What I claim, and desire to secure by Letters Patent of the United States, is—

A shoe for cloven-footed animals made of a single piece of thin metal provided with an upwardly-bent outer side to hook over the edge of the hoof, and having an inner side bent at its upper edge into a horizontal flange, said horizontal flange being arranged to spring into a horizontal groove in the hoof when the shoe is forced upon the foot, substantially as described.

In testimony whereof I have hereunto set my hand in the presence of two witnesses.

BERNHARD BRAND.

Witnesses:
  WOLDEMAR HAUPT,
  HENRY HASPER.